United States Patent

Johnston

[15] 3,661,495

[45] May 9, 1972

[54] PROCESS FOR BURNING A COMBUSTIBLE LIQUID USING CELLULAR CERAMIC NODULES

[72] Inventor: William D. Johnston, Pittsburgh, Pa.

[73] Assignee: Pittsburgh Corning Corporation, Pittsburgh, Pa.

[22] Filed: May 19, 1970

[21] Appl. No.: 38,866

[52] U.S. Cl. ............................................431/7, 210/40, 431/326
[51] Int. Cl. ..........................................................................F23d 3/18
[58] Field of Search......................431/2, 4, 7, 326; 44/51, 3, 44/4, 7; 210/40; 65/22, 21

[56] References Cited

UNITED STATES PATENTS

| | | | |
|---|---|---|---|
| 2,691,248 | 10/1954 | Ford | 65/22 X |
| 3,441,396 | 4/1969 | D'Eustachio et al. | 65/22 |
| 3,354,024 | 11/1967 | D'Eustachio et al. | 161/168 |
| 3,556,698 | 1/1971 | Tully et al. | 431/2 |

OTHER PUBLICATIONS

Combating Polution Created By Oil Spills, Report to the Department of Transportation, U.S. Coast Guard, Arthur D. Little, Inc. June 30, 1969, p. 79– 85, 101– 103. TD427.p4, L5.

A Status Report on the Use of Chemicals and Other Materials to Treat Oil Spilled on Water, Federal Water Polution Control Administration, Department of the Interior, by Edison Water Quality Laboratory, Northeast Region, Edison, N.J. March 1969, p. 19– 20.

*Primary Examiner*—Frederick L. Matteson
*Assistant Examiner*—W. C. Anderson
*Attorney*—Stanley J. Price

[57] ABSTRACT

A process for the substantially complete combustion of a combustible liquid including the combustion of a layer of the combustible liquid floating on a body of water. Cellular ceramic nodules having a core of separate closed cells and substantially continuous outer surfaces or skins with a coating of particulate alumina parting agent adhering thereto are treated to remove a substantial portion of said particulate alumina parting agent. The nodules are preferably washed in a water or dilute acid bath with mild agitation, to loosen and remove the particles of alumina parting agent adhering thereto without substantial abrasion or fracturing of the continuous outer skin. The treated nodules are relatively dust free and have a smoother outer surface. A layer of the treated cellular ceramic nodules is formed on the upper surface of the combustible liquid with a substantial number of the nodules in contiguous relation with adjacent nodules in the layer. The upper exposed surfaces of the nodules are wetted with the combustible liquid to form a film or layer thereon and the wetted films on the exposed surfaces of the nodules are ignited until combustion is self-sustaining. The combustible liquid films on the exposed upper surfaces of the nodules consumed by combustion, are continually replaced with combustible liquid from the bulk of the liquid until substantially all the combustible liquid is consumed.

9 Claims, No Drawings

PROCESS FOR BURNING A COMBUSTIBLE LIQUID USING CELLULAR CERAMIC NODULES

BACKGROUND OF THE INVENTION

1. Field of the Invention

This invention relates to a process for the burning of a combustible liquid and more particularly to a process for the complete combustion of a layer of combustible liquid floating on a body of water.

2. Description of the Prior Art

During the transfer of liquid fuel from one vessel to another, either at sea or on other navigable waters, discharge of combustible hydrocarbon liquids or other pollutants onto the water often occurs. Similarly, accidents in the production and transportation of petroleum products, such as weld blowouts and pipeline leaks, cause major water pollution problems. Such accidents and other catastrophes, such as the sinking or damaging of an ocean going or river transportation vessel, cause water pollution problems that are often unsolvable or that are remedial only at exorbitant expense. The possibility of such incidents of water pollution and contamination of adjacent land areas has severely restricted the recovery of large amounts of petroleum from off-shore reservoirs.

An inexpensive solution would be the combustion of the layer of pollutant liquid from the surface of the water. This solution, however, has not been found feasible for many reasons. For example, many hydrocarbon liquids and other pollutant liquids are not readily ignitable. Furthermore, in many instances in which ignition can be obtained, it is not possible to sustain combustion long enough or at sufficiently high temperatures, to consume the pollutant liquid.

Even when dealing with liquids that ordinarily are readily ignitable and relatively combustible, the presence of a relatively thin layer of such liquid underlain by a large body of water produces a physical system in which ignition cannot be obtained or in which combustion cannot be sustained at all or cannot be sustained at sufficiently high temperatures to effect removal of the pollutant liquid. These problems generally arise from the rapid transfer of heat into the underlying body of water and away from the rapid transfer of heat into the underlying body of water and away from the combustible liquid.

Several other solutions to the pollution problem have been suggested in the prior art. It has been suggested that the pollutant be confined with a ring of trash booms or similar devices and then scooped from the water's surface. That solution has been proved to be exorbitantly time consuming and expensive and not completely effective.

Attempts have also been made to absorb the pollutant liquid in straw or other absorbent material which is subsequently transported from the scene nd destroyed. That solution has also proved too expensive, time consuming and not entirely satisfactory.

Another proposed solution to the problem is disclosed in U.S. Pat. No. 3,556,698 and comprises covering the surface of the pollutant liquid with particulate silica particles which have been coated with a surface active agent to render the silica particle hydrophobic and burning the pollutant liquid treated with the silica particles. One problem inherent in the use of this method arises from the fact that not all of the pollutant liquid is consumed and the residue agglomerates with the silica particles leaving crusty patches of siliceous pollutant residue floating on the water's surface. The pollutant residue must be scooped or otherwise removed from the surface.

In reference to the combustion of the pollutant liquid on the surface of the water, attempts have been made to burn away the pollutant liquid through the use of various igniters or combustion catalysts. This method has, in the past, proved unsatisfactory because of the inherent expense and the inability to completely consume and remove the pollutant liquid. The removal of the pollutant liquid by combustion can be effectively accomplished by a process described and claimed in copending application, Ser. Number 829,746, filed on June 2, 1969 and includes floating a layer of cellular ceramic nodules with a textured outer surface on the upper surface of the pollutant liquid and then burning the pollutant liquid. The cellular ceramic nodules, with the textured outer surface, serve as a combustion enhancing agent so that the layer of pollutant liquid which, without nodules, does not sustain combustion, and with the layer of nodules thereon, burns readily and substantially completely. As described in co-pending application Ser. No. 829,746, entitled "Process For Burning a Combustible Liquid Using Cellular Ceramic Nodules", the cellular ceramic nodules are abraded to remove the outer continuous skin and expose the inner surfaces of the separate cells therebeneath and provide the textured outer surface. The removal of the continuous outer skin by abrasion, is a relatively expensive and time consuming process. Also, the removal of the outer continuous skin provides a more friable outer surface that requires special handling to prevent degradation and the formation of dust. It has been found that the presence of dust on the nodule's surface, adversely affects the efficiency of the nodules as a combustion enhancing agent.

SUMMARY OF THE INVENTION

The present invention is an improvement of the process described and claimed in copending application Ser No. 829,746 entitled "Process For Burning a Combustible Liquid Using Cellular Ceramic Nodules" in the names of Nicholas T. Castellucci and Ned C. Krouskop as applicants. Cellular ceramic nodules cellulated in a rotary furnace in the presence of a hydrated alumina parting agent have a coating of the particulate parting agent adhering to the substantially continuous outer skin. The nodules are treated to remove a substantial portion of the particulate parting agent while retaining the substantially continuous outer skin. The substantially continuous outer skin provides integrity for the nodule so that the surface is not as friable as a nodule with a textured outer surface. It is preferred that the nodule be washed in a water or dilute acid bath with mild agitation to remove the particulate alumina parting agent adhering to the outer surface.

A plurality of the treated cellular ceramic nodules are deposited on the upper surface of the combustible liquid to be burned so that they float thereon with a substantial number of nodules in contiguous relation. The nodules are wetted by the combustible liquid and then the liquid is ignited and burned on the exposed upper surface of the nodules remote from the major portion of the layer of liquid being burned. Combustion of the liquid on the exposed upper surface of the nodule is thereafter continued in a substantially self-sustaining manner until substantially all of the combustible liquid has been burned or consumed in the combustion process.

The process includes isolating a portion of the combustible liquid as a film on the exposed surface of the nodules so that the film of combustible liquid is separated from the body of water. On the upper exposed surface of the nodule, remote from the body of water, ignition and sustained combustion of the liquid film takes place. The film of combustible liquid on the upper surface of the nodule is continually replaced with liquid from the layer of combustible liquid through capillary action.

Accordingly, it is an object of this invention to provide a process for substantially completely burning a liquid pollutant and thereby removing the liquid pollutant from the surface of a body of water.

Another object of this invention is to provide a process for enabling or enhancing the combustion of a combustible liquid which is otherwise difficult to ignite or difficult to sustain combustion.

DESCRIPTION OF THE PREFERRED EMBODIMENT

Cellular ceramic nodules suitable for use in the hereinafter described process may be prepared in accordance with a process described in U.S. Pat. No. 3,354,024 from a pulverulent glassy material and a cellulating agent or from other pulverulent materials and a cellulating agent in accordance with the process described in U.S. Pat. No. 3,441,396. In U.S. Pat. No. 3,354,024, the nodules are made by admixing relatively fine pulverulent glass with a cellulating agent, such as carbon black, or the like. A binder is then added to the mixture and the mixture is then pelletized and the pellets are coated with a parting agent such as hydrated aluminum oxide, $Al_2O_3 \cdot 3H_2O$. The parting agent serves to prevent the pellets from sticking and maintains the pellets discrete during the cellulation process. The pellets are heated in a rotary furnace or kiln to a cellulating temperature and the pellets cellulate to form substantially spherical cellular ceramic nodules with a continuous outer skin coated with the particulate alumina parting agent. Although pulverulent glass is a preferred constituent of the cellular ceramic nodule, other glassy materials, as described in U.S. Pat. No. 3,441,396 may be used. The term "ceramic" is intended to encompass both pulverulent formulated glass and other suitable pulverulent glassy materials. The cellular ceramic nodules thus produced have a core of individual, completely closed cells of ceramic material and a substantially continuous outer skin of ceramic material with a coating of particulate parting agent adhering thereto.

The cellular ceramic nodules produced as described above are thereafter treated to remove a substantial portion of the particulate parting agent adhering thereto while retaining the substantially continuous outer skin. The nodules are washed with either water or a dilute acid as for example, between 5 and 10 percent by weight hydrochloric acid. The following washing process has been found suitable to remove a substantial portion of the particulate parting agent adhering to the surface of the nodules. A container is partially filled with coated nodules and, thereafter, substantially filled with the washing liquid. The container is then closed and is mildly agitated. The nodules are thereafter separated from the liquid and the above procedure is repeated with other liquid until the liquid, after separation, is clear and substantially free of particulate parting agent. It should be understood, that other washing processes may be employed to remove the particulate alumina parting agent and retain a substantially continuous outer skin.

The process for removing liquid combustible pollutants from a body of water and for enabling and enhancing the combustion of liquids generally includes depositing a quantity of cellular ceramic nodules treated as above described, on the upper free surface of the combustible liquid. The nodules appear to be wetted with the combustible liquid so that thin films of the combustible liquid are isolated from the body of water and supported on the upper exposed portion of the nodules. The film of combustible liquid supported by the treated cellular ceramic nodules readily ignites and burns. Further, the liquid in the film is continually replaced by other liquid from the layer floating on the body of water. The replacement of the film and combustion continue until substantially all of the combustible liquid floating on the body of water is removed by combustion.

The treated cellular ceramic nodules produced as described above exhibit many characteristics which are readily and preferantially adaptable for the herein described process. For example, in this process the combustion enhancing agent should be impervious or impermeable to the flow of fluids into and through the combustion enhancing agent. Therefore, all of the liquid to be burned remains on the surface of the combustion enhancing agent and is accessible for combustion and ultimate burning. The combustion enhancing agent remaining after combustion of the combustible liquid is substantially devoid of the combustible liquid, thereby obviating further treatment or purification of the combustion enhancing agent.

The treated cellular ceramic nodules have a density less than the density of the water and preferably less than the density of the liquid to be burned. It is essential that the nodules float on the upper surface of the water and preferably on the upper free surface of the liquid to be burned. It is also preferred that the nodules float on the liquid to be burned with only a portion of the nodule submerged below the surface of the liquid to be burned and have an upper exposed portion above the surface. Nodules produced as previously described generally have an apparent density of between about 6 pounds per cubic foot and 30 pounds per cubic foot. Nodules with a density of the above range have exhibited a high degree of efficiency when used in this process.

Another preferred property of the combustion enhancing agent is that the agent have a chemical composition that is inert and unreactive with the material to be burned as well as with the surrounding atmosphere and the body of water on which it floats. The treated cellular ceramic nodule is chemically inert with respect to combustible liquid hydrocarbons, air and water so that the surface morphology of the nodule will not be altered substantially during the combustion process and the density and other desirable properties of the nodule will not be altered substantially during the combustion of the combustible liquid thereon.

It is preferred that the gross configuration of the nodule be substantially spherical to provide greater burning efficiency when in contiguous relation. However, the process can be practiced with an inventory of nodules that exhibit a substantial degree of nonsphericity.

The size of the cellular ceramic nodule is a function of several parameters, among which are the nature of the liquid to be burned; the specific composition and unique morphology of the treated cellular ceramic nodule employed; the cell size of the nodule; the ambient physical conditions around the system comprising the nodule; the combustible liquid to be burned; and the underlying water; and the temperature and other physical and chemical characteristics internal to the system comprising the nodules and the two liquids. In some relatively common circumstances nodules having a diameter of between about one thirty-second inch and one-half inch were found suitable for use in this process. In use with common crude oil and other petroleum products, nodules having a diameter of about one-fourth inch were found to be highly effective for use in this process.

It is believed that the thermal properties of the treated cellular ceramic nodules contribute substantially to the combustion process. The efficiency of combustion and of liquid removal are substantially enhanced where the combustion enhancing agent operates in the physical system as a thermal insulator between the body of water and the film of combustible liquid on the surface of the nodule. The nodules used in this process have a thermal conductivity substantially lower than the combustible liquid. With crude petroleum, other common petroleum products and other hydrocarbon liquids, nodules having a thermal conductivity of between about 0.40 and 0.50 Btu./hr./sq. ft./° F./in. at 75° F. function extremely efficiently and result in the complete combustion and removal of the combustible liquid with no residue remaining in the system.

To maintain a continued burning efficiency, it is also desirable that the melting point of the nodules be substantially higher than the flash point and combustion temperature of the combustible liquid. The treated cellular ceramic nodules produced according to the above described process maintain their physical integrity and surface morphology up to temperatures of about 1,000° F. The use of nodules having a high melting point is also desirable because it is believed the herein described process has been found to enhance both the temperature and the rate of combustion for a given combustible liquid.

It appears, as the nodules float in the liquid to be burned, that the liquid is lifted from the layer in two ways. First, the liquid forms a thin film around the exposed outer surface of each cellular ceramic nodule and that film is maintained in place by the attractive or adhesive forces generated by the intermolecular forces and attractions between the molecules of the liquid and the treated cellular ceramic nodules. Secondly, it is believed that a surface capillarity on the surface of the nodule takes place in that preferentially the film of combustible liquid rises onto the exposed nodule sur-face from the surrounding layer of combustible liquid and the film is continually replaced from the layer by this surface capillarity.

Because of the formation of the thin film of liquid around each nodule and the continued replacement of the liquid, the process functions efficiently with a monolayer, or partial monolayer, of treated cellular ceramic nodules positioned on the surface of the combustible liquid.

A partial monolayer is formed on the surface of the combustible liquid by the self-attraction of the nodules for each other. The nodules have been observed moving toward each other over limited distances into contiguous relation with adjacent nodules and remaining in contiguous relation as an isolated patch or floating island of nodules. It is believed that the attractive force is created by capillary attraction. A miniscus is formed at each nodule and the nodules are wetted and attracted to each other. Once a floating nodule contacts an adjacent nodule, it has a tendency to adhere thereto. This feature, in addition to contributing to the burning efficiency, is also advantageous when waves are present on the surface of the combustible liquid.

The ignition and combustion of the combustible liquid is sustained in a combustion zone which may be defined as the upper or exposed surface of the treated cellular ceramic nodules remote from the underlying body of water. In most instances, the creation of the thin film of liquid permits ignition of the liquid by the mere application of heat by means of an open flame on the upper surface of the nodules. In some circumstances, however, where the combustible liquid is not readily ignitable, an igniter such as a highly flammable fluid which has a relatively low flash point can be added to the combustible liquid to facilitate ignition of the combustible liquid. It should be noted, however, that only a relatively small amount of the igniter need be added to the combustible liquid to initiate ignition. After ignition initiated there is a flame spread across the other nodules in the layer to propagate combustion throughout the entire layer of nodules.

During combustion the amount of liquid supplied to the combustion zone, that is the upper surface of the treated cellular ceramic nodules is, in this process, optimized in the sense that sufficient liquid is supplied to the combustion zone to support rapid, high temperature combustion while excess combustible liquid is maintained below or out of the combustion zone, thereby preventing the wasteful transfer of heat through the combustible liquid to portions of that liquid not being burned in the combustion zone. In addition, the zone of combustion is maintained at the upper surface of the cellular ceramic nodules which have the previously discussed thermal insulating properties, thereby separating the heat source from the underlying water and minimizing the heat loss to the body of water therebelow.

With their low thermal conductivity, the nodules function as thermal insulators during combustion thereby preventing loss of heat to the underlying water and confining and concentrating the available heat to the region of combustion in the thin film of liquid on the surface of the nodules.

The creation and maintenance of a restricted and insulated combustion zone with a continuous supply of combustible material provides a highly efficient thermal system effecting complete combustion of the liquid at unusually high temperatures and rapid combustion rates. The observed combustion obtained with this process leaves substantially no residue on the surface of the water other than the nodules and provides less noxious fumes and smoke.

The impervious nature of the treated cellular ceramic nodules prevents the absorption of liquid into the nodules themselves with the result that all of the liquid is maintained available for combustion and the surfaces of the nodules remain substantially unchanged throughout the process to provide a relatively fixed combustion zone.

A substantially spherical shape of the nodules is preferred in their use in this process because the spherical characteristic provides only point contact between contiguous nodules so as not to interfere substantially with capillary spaces between the nodules. It is also believed that the surface morphology of a spherical nodule contributes substantially to the film formation of the combustible liquid previously discussed.

In certain circumstances, such as on a large body of water, it is not always possible to completely cover the surface of the combustible liquid with a layer of treated cellular ceramic nodules. It appears, however, that the nodules are attracted to each other and an isolated monolayer or island of contiguous nodules is formed on a portion of the surface of the liquid and continuous combustion takes place on the floating island of contiguous nodules. Also, during the combustion process, it appears that the combustible liquid is drawn into the area of the isolated island of nodules and upwardly into the combustion zone by the kinetic effects of combustion and the intermolecular cohesion between the liquid molecules and adhesion between the liquid molecules and the treated cellular ceramic nodule. Where necessary, the process can be performed over successive areas of the body of water by confining the combustion process within a suitable boundary element such as a floating ceramic or insulated metal container or fence.

As illustrated in the following Table, the wetting rates of crude oil on the treated nodules were conducted at room temperature and the calculation of these wetting rates were based on the surface area of the spheres and the time for complete wetting. The wetting rate of the treated nodules was compared with that of nodules having particulate alumina parting agent adhering to the outer surface and to the abraded nodules having an abraded textured outer surface. The wetting rates are set forth in Table I.

TABLE I

Wetting Rates of Nodules in Crude Oil at Room Temperature
(Figures are in mm.$^2$/min.)

| Abraded Textured Surface | Acid and H$_2$O Washed Nodules | Alumina Covered |
| --- | --- | --- |
| 36.53 | 135.85 | 34.00 |
| 59.50 | 74.80 | 69.50 |
| 43.15 | 43.71 | 69.81 |
| 30.56 | 34.67 | 47.87 |
| 42.45 | 174.53 | 70.13 |
| — | 87.27 | 65.45 |
| Average 42.44 | Average 91.81 | Average 59.46 |

As is apparent from the above Table I, the wetting rate of the treated nodules is greater than that for nodules having the particulate alumina parting agent adhering thereto and greater than the wetting rate for nodules having an abraded or textured surface.

EXAMPLES

A series of tests were conducted with Bunker C oil to determine whether the treated nodules were an equivalent combustion enhancing material to nodules with a textured outer surface.

The tests were conducted under the following conditions. A rectangular skirt of aluminum foil having dimensions of about 8 × 8 feet, was weighed. A segment of aluminum foil approximately 72 inches long and 9 inches wide was also weighed. A quart of Bunker C oil was weighed and treated nodules used in the burn were also weighed. A cylindrical container having a diameter of approximately 22 inches and a height of about 12 inches was positioned on the center of the skirt and filled to within one-fourth inch of the upper rim with water. The strip of aluminum foil was positioned around the container adjacent the upper surface and bent over the annular rim. The weighed quart of oil was then poured on the upper surface of the water in the container and the weighed quantity of treated nodules was positioned on the layer of oil, forming a monolayer of contiguous nodules. After the nodules were wetted by the oil, the oil films on the treated nodules were ignited and the oil burned on the surface of the water. After combustion was complete, a fine mesh colander was weighed and used to remove both the nodules and the remaining oil residue floating on the upper surface of the water. The nodules, residue, colander and the aluminum foil skirt and rim were then placed in an oven and dried until a constant weight was attained. From the above weights, the remaining oil residue after combustion was calculated.

As a control, dusty, abraded nodules with an inferior surface morphology having a size to pass through a 4 mesh Tyler Standard Screen and being retained on an 8 mesh Tyler Standard Screen were used. The treated nodules had substantially the same size as the control nodules. Nodules having a size capable of passing through a 3 mesh Tyler Standard Screen and being retained on a 6 mesh Tyler Standard Screen with a relatively fine cell size and abraded in fluidized bed were tested under the above conditions to determine the amount of oil residue remaining after combustion. Further, similar nodules abraded in a ball mill and having substantially the same size as the nodules abraded in a fluidized bed were tested under the above conditions to also determine the efficiency of the nodules as combustion enhancing agents by determining the amount of oil residue remaining after combustion. Table II below enumerates the per cent by weight of the residue or unburned oil remaining after being subjected to combustion with treated nodules, abraded control nodules and nodules abraded in a fluidized bed and in a ball mill.

TABLE II

| Type of Nodule | % by Weight Oil Residue Remaining |
| --- | --- |
| Treated Washed | 11.8 |
| Fluidized Bed Abraded | 11.1 |
| Ball Mill Abraded | 11.6 |
| Control | 20.1 |

From the above it will be apparent that the treated nodules have substantially the same efficiency as a combustion enhancing agent as the abraded nodules. When it is considered that about 90 percent by weight of the oil floating as a thin film on the surface of the water is removed by combustion, the treated nodules exhibit excellent combustion enhancing properties. The Bunker C oil employed in the above tests is believed to be one of the more difficult petroleum fractions to ignite, especially when floating on a body of water.

Although the tests are directed to combustion of Bunker C oil floating on a body of water, it should be understood that it is also possible, with the treated nodules, to obtain controlled combustion of the difficult to ignite petroleum fractions in containers such as pot-like furnaces or the like whereby the treated nodules floating on a body of the liquid isolates a portion of the liquid as a film upon the upper surface of the nodules and the film may be ignited and burned at a controlled rate. The treated nodules may thus be employed to burn the Bunker C oil without air unjection jets, steam jets or chemical treatment of the Bunker C oil.

According to the provisions of the patent statutes, I have explained the principle, preferred construction and mode of operation of my invention and what is now considered to represent its best embodiment has been illustrated and described. However, it should be understood that, within the scope of the appended claims, the invention may be practiced otherwise than as specifically illustrated and described.

I claim:

1. A process for burning a combustible liquid comprising,
   obtaining cellular ceramic nodules having a continuous outer skin with particles of a particulate parting agent adhering thereto,
   treating said nodules to remove a substantial portion of said particulate parting agent to obtain a relatively smooth continuous outer skin,
   depositing said treated nodules on the upper surface of a body of combustible liquid in a manner that said nodules float on said body of combustible liquid and the upper portions of said nodules are exposed above the upper surface of said body of combustible liquid, said treated nodules being impervious to the flow of combustible liquid into and through said nodules,
   forming relatively thin films of said combustible liquid on the outer surface of the upper exposed portions of said nodules,
   said treated nodules insulating said thin films on the outer surface of the exposed portions of said nodules from said body of combustible liquid,
   igniting and burning said combustible liquid in said thin film, and
   continuously replacing said combustible liquid in said thin film from said body of said combustible liquid.

2. A process for burning a combustible liquid as set forth in claim 1 which includes,
   treating said nodules by washing said nodules in an aqueous bath to remove a substantial portion of said particulate parting agent.

3. A process for burning a combustible liquid as set forth in claim 2 in which,
   said aqueous bath for treating said nodules is a dilute acid bath.

4. A process for burning a combustible liquid as set forth in claim 1 in which,
   said body of combustible liquid comprises a layer floating on the upper surface of a body of water, and
   said treated nodules insulating said film from said body of water.

5. A process for burning a combustible liquid as set forth in claim 1 which includes,
   forming a monolayer of said treated nodules on the upper surface of said body of combustible liquid, a substantial portion of said treated nodules being in contiguous relation with adjacent nodules.

6. A process for burning a combustible liquid as set forth in claim 1 which includes,
   maintaining a portion of said nodules in contact with said body of combustible liquid,
   wetting the exposed upper surface of said nodules with said combustible liquid.

7. A process for burning a combustible liquid as set forth in claim 1 in which,
   said nodules have an apparent density of between about 6 and 30 pounds per cubic foot and a thermal conductivity of between about 40 and 50 Btu/hr./sq.ft./° F./in. at 75° F.

8. A process for burning a combustible liquid as set forth in claim 1 in which said treated nodules have a substantially spherical configuration, and
   said nodules have a diameter of between about one thirty-second inch and one-half inch, and
   said treated nodules being impervious to said combustible liquid and chemically inert to said combustible liquid.

9. A process for burning a combustible liquid as set forth in claim 1 in which said particulate parting agent comprises aluminum oxide.

* * * * *